Figure 1:
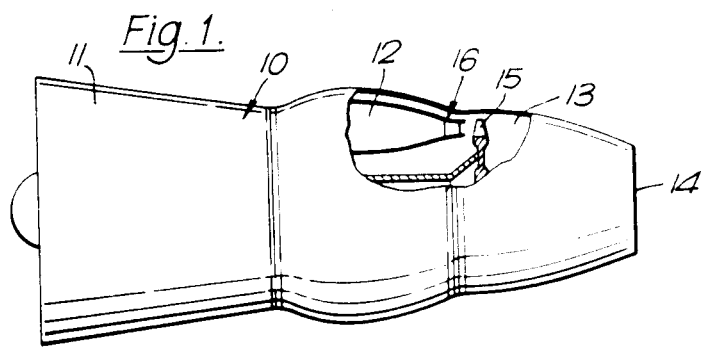

United States Patent [19]

Pask

[11] Patent Number: 4,798,514

[45] Date of Patent: Jan. 17, 1989

[54] NOZZLE GUIDE VANE STRUCTURE FOR A GAS TURBINE ENGINE

[75] Inventor: George Pask, Stanton-by-Bridge, England

[73] Assignee: Rolls-Royce Limited, London, England

[21] Appl. No.: 165,953

[22] Filed: Jun. 24, 1980

Related U.S. Application Data

[63] Continuation-in-part of Ser. No. 903,703, May 4, 1978, abandoned.

[30] Foreign Application Priority Data

| May 5, 1977 [GB] | United Kingdom | 18782/77 |
| Apr. 28, 1978 [FR] | France | 78 12740 |
| Apr. 28, 1978 [IT] | Italy | 22829 A/78 |
| May 5, 1978 [DE] | Fed. Rep. of Germany | 2819808 |

[51] Int. Cl.⁴ ............................................. F01D 5/14
[52] U.S. Cl. .................................... 415/115; 416/97 A
[58] Field of Search ............ 415/136, 189, 190, 199.2, 415/199.5, 217, 115; 416/97 A

[56] References Cited

U.S. PATENT DOCUMENTS

| 3,302,926 | 2/1967 | Bobo | 415/217 |
| 3,314,648 | 4/1967 | Howald | 415/115 |
| 3,515,499 | 6/1970 | Beer et al. | 416/97 A |
| 4,126,405 | 11/1978 | Bobo et al. | 416/97 A |
| 4,168,348 | 9/1979 | Bhangu et al. | 416/97 A |

Primary Examiner—David H. Brown
Attorney, Agent, or Firm—Cushman, Darby & Cushman

[57] ABSTRACT

A nozzle guide vane assembly for a gas turbine engine comprises inner and outer porous sheet metal platform rings and a plurality of aerofoils extending between the rings, each of the aerofoil portions having mounting means at its inner and outer extremities by which the aerofoils, and thus the rings, are supported from fixed engine structure.

10 Claims, 3 Drawing Sheets

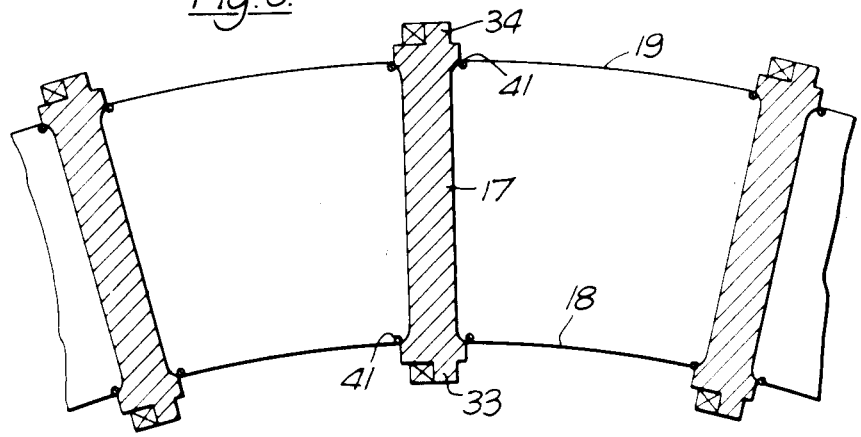
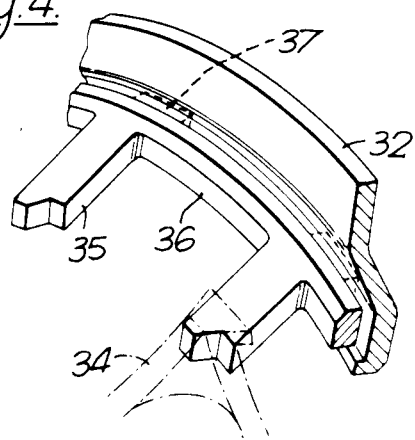

NOZZLE GUIDE VANE STRUCTURE FOR A GAS TURBINE ENGINE

This application is a continuation-in-part application of U.S. application Ser. No. 903,703, filed May 4, 1978, and now abandoned.

This invention relates to a nozzle guide vane structure for a gas turbine engine.

In the past the nozzle guide vanes of gas turbine engines have normally comprised separate vanes each having an aerofoil and inner and outer platforms which are assembled together to form an annular array of aerofoils and complete annular inner and outer platforms. These vanes have been troublesome both to manufacture and to design to give efficient performance. Thus because the platforms extend generally perpendicular to the aerofoil, difficulties are experienced in the casting of the blades, and because the platforms abut together to form an annular member it is difficult to effectively seal at all the abutments. It is also difficult to cool the platforms.

The present invention provides a nozzle guide vane assembly in which some of these problems are avoided.

According to the present invention a nozzle guide vane assembly for a gas turbine engine comprises:

fixed engine structure;

inner and outer platform rings, both of said inner and outer platform rings being made substantially entirely of a porous sheet material whereby cooling air may pass through each of said rings from one surface to the other surface thereof;

a plurality of aerofoil portions extending between said rings and having inner and outer extremities extending through and out of said rings; and mounting means directly connected to said inner and outer extremities of each of said aerofoil portions for mounting said aerofoil portions from said fixed engine structure, said mounting means directly supporting said aerofoil portions from said fixed engine structure and indirectly supporting said inner and outer rings through said aerofoil portions from fixed engine structure whereby operational loads on said aerofoil portion and loads on said rings are supported from said fixed engine structure.

Preferably the porous sheet metal platform rings may be porous transpiration cooled structure of the laminated type.

The mounting means for the aerofoils may be arranged to allow for radial growth of the vane structure; thus in one embodiment each mounting means comprises a substantially axially extending arm which abuts against the aerofoil and the fixed structure.

Figure 2:
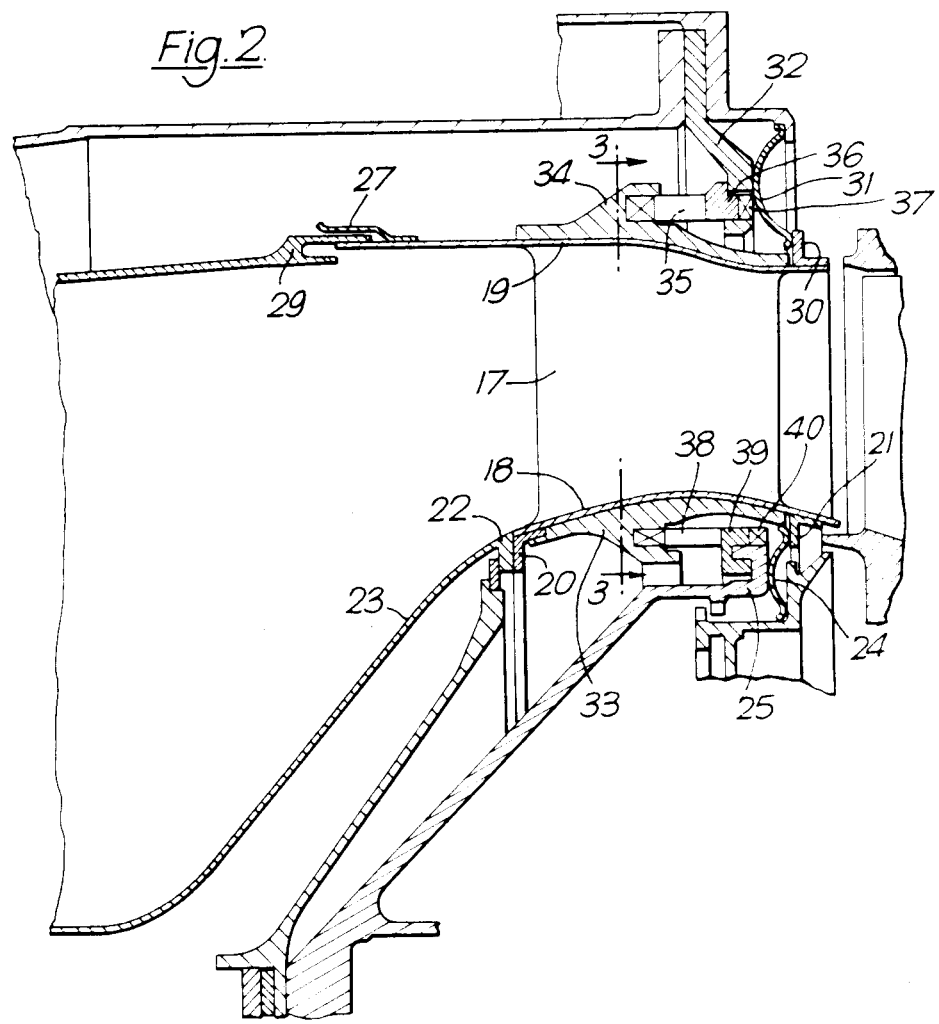
Figure 5:
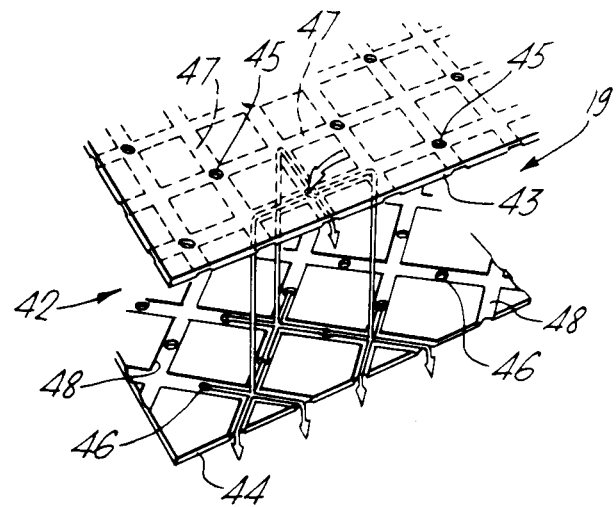

The invention will now be particularly described, merely by way of example, with reference to the accompanying drawings in which:

FIG. 1 is a partly broken away view of a gas turbine engine having a nozzle guide vane structure in accordance with the invention, FIG. 2 is an enlarged section of the nozzle guide vane structure of FIG. 1, FIG. 3 is a section on the line 3—3 in FIG. 2, FIG. 4 is a perspective view of the mounting structure of the previous figures, and FIG. 5 is an enlarged fragmentary perspective view of the porous sheet material for the inner and outer platform members.

In FIG. 1 there is shown a gas turbine engine comprising a casing 10, within which are mounted in flow series a compressor 11, combustion system 12, and a turbine 13 and which forms a final nozzle 14. Operation of the engine is conventional.

In order to direct hot gases from the combustion chamber 12 onto the rotor blades 15 of the turbine, a nozzle guide vane structure generally indicated at 16 is provided. This structure 16 is shown in more detail in FIGS. 2 and 3 and it will be seen that basically the vane structure comprises a number of angularly spaced apart aerofoil sections 17 which extend between inner and outer platform rings 18 and 19. It will be seen from FIG. 3 particularly that the rings 18 and 19 are unitary rings of thin porous sheet metal. The inner ring 18 is provided with forward and rearward angle section sealing and stiffening rings 20 and 21, the forward rings 20 abutting against a flange 22 formed on the inner downstream section 23 of the combustion chamber so as to seal against it. The rearward ring 21 has a spring 24 pressing up against its forward face, the spring 24 serving to seal between the ring 21 and fixed structure of the engine at 25.

The outer platform ring 19 extends forwardly of the front edge of the aerofoils 17 and is provided on its outer surface with a sealing sleeve 27. The sleeve 27 is arranged to leave an annular gap between itself and the ring member 19 within which telescopes the downstream end 29 of the outer portion of the combustion chamber so as to seal therein. At its downstream edge the member 19 is provided with an angle section ring 30 which seals in a manner similar to the member 21 against a spring 31 and thus against fixed structure 32.

It will be seen that as described so far, the nozzle guide vane structure differs from the conventional structure in that instead of comprising an annular assembly of separate vanes which abut together, this assembly comprises one piece inner and outer platforms with aerofoil portions attached to them. In this way sealing problems between adjacent platform sections are avoided, but it will be seen that because of the thin relatively flexible nature of the platform members 18 and 19 it is undesirable to allow these members to bear any substantial loads such as would normally be applied to them by gas loads and thermal expansions and contractions of the vane aerofoils 17. The mounting structure of the present embodiment is therefore arranged so that the platform members need not carry any substantial loads even when differential expansions take place. To this end the aerofoil portions 17 are each provided with inner and outer projections 33 and 34. Each projection, as is best seen from FIG. 4, has an abutting surface formed therein which acts upon a corresponding abutting surface formed on a load carrying finger. In the case of the outer projections 34 these fingers 35 are shown in FIG. 4 and it will be seen that each of the fingers 35 comprises an axially extending projection from a ring 36. Although they are axially extending, the projections 35 do not extend in an axial direction but are skewed to such an extent that they extend in the direction of the resolved forces to be carried from the projection 34.

The ring 36 in turn bears against the fixed structure 32 and is provided with dogs 37 which engage in correspondingly shaped recesses in the structure 32 to prevent relative rotation.

The inner structure which takes loads from the projection 33 is similar to the outer structure and is not shown in a separate perspective view. However, once again there are a number of projecting fingers 38 from a ring 39 which bears on the fixed structure 25 and is dogged at 40 to prevent relative rotation.

Operation of this mounting structure is that any considerable loads acting on the aerofoils 17 are carried directly from the projections 33 and 34 and into the relevant projecting fingers, thence into the rings 36 and 39 and to the fixed structure 32 and 25. Because the fixed structure at 32 and 25 is likely to be at a much lower temperature than the aerofoils and the platform rings it is clear that differential expansion must take place, and this is permitted in the mounting structure described by the inward or outward movement of the ends of the arms 35 and 38 which contact the blade and consequent twisting of the rings 36 and 39. Because of the length of the arms 35 and 38, a relatively large amount of expansion is permitted without the rings having to twist through a very large angle, and in this way it is arranged that frictional forces do not inhibit the differential expansions. Therefore the complete assembly of aerofoils 17 and platform members 18 and 19 is allowed to expand and contract without deforming the thin platform members.

There are a number of other features of the construction shown which should be noted. Thus as described so far, there are no cooling means either for the aerofoil 17 or the inner and outer platform members 18 and 19. So far as the aerofoils 17 are concerned, any of the normal cooling systems known in the art which use various combinations of impingement, convection and film cooling may be used. With regard to the platform members 18 and 19 these are made at least substantially entirely from a porous material and preferably from a porous material 42 which comprises a plurality of abutting laminates 43 and 44 (shown in spaced apart positions in FIG. 5 for purpose of clarity) so arranged so as to cause cooling air to follow a tortuous passage in passing from one surface to the other through the holes 45 and 46 connected by the channels or passages 47 and 48. This material may be of the type shown in U.S. Pat. No. 4,168,348 issued Sept. 18, 1979 to Bhangu et al, or U.S. Pat. No. 3,620,643 issued Nov. 16, 1971 to Jones, both assigned to the same assignee, Rolls-Royce Limited, Derby, England, as this application.

It is proposed that to manufacture the construction in accordance with the invention a plurality of cast aerofoil members 17 should be brazed into corresponding apertures in the platform members 18 and 19 and the position of this braze is indicated at $4^1$ in FIG. 3. It should be noted that the separate aerofoil portions 17 are relatively easy to cast because they are substantially flat members without any considerable projections from their plane as would be the case with separate vanes.

It should be noted that the construction described above could be altered in a number of ways. Thus in particular the mounting structure for the above assembly, although particularly effective could be replaced by an alternative. Also the various seals described could be replaced by other alternatives.

The thin porous sheet material which forms the inner and outer platform members may also be made of a variety of porous transpiration cooled materials.

I claim:

1. A nozzle guide vane assembly for a gas turbine engine comprising:
   fixed engine structure;
   inner and outer platform rings, both of said inner and outer platform rings being made substantially entirely of a thin relatively flexible porous sheet material having tortuous passages therethrough whereby cooling air may pass through each of said rings from one surface to the other surface thereof;
   a plurality of aerofoil portions extending between said rings and having inner and outer extremities extending through and out of said rings, said aerofoil portions receiving substantially all of any loads on said platform rings; and
   mounting means directly connected to said inner and outer extremities of each of said aerofoil portions for mounting said aerofoil portions from said fixed engine structure, said mounting means directly supporting said aerofoil portions from said fixed engine structure and indirectly supporting said inner and outer rings through said aerofoil portions from fixed engine structure whereby operational loads on said aerofoil portions and loads on said rings received by said aerofoil portions are transferred to said fixed engine structure.

2. A nozzle guide vane assembly as claimed in claim 1 and in which said porous sheet metal comprises a laminated structure, each lamina having holes therethrough and abutting surfaces of adjacent laminae with passages formed therein which interconnect the holes in the adjacent laminae.

3. A nozzle guide vane assembly as claimed in claim 1 and in which there are sealing means associated with each said platform ring and adapted to seal against adjacent fixed engine structure.

4. A nozzle guide vane assembly as claimed in claim 3 and in which said sealing means includes at least one angle section flange carried from the surface of said ring distant from said aerofoil.

5. A nozzle guide vane assembly as claimed in claim 4 and in which there are two said flanges on one ring, mounted adjacent the forward and rearward extremities of the ring.

6. A nozzle guide vane assembly as claimed in claim 1 and in which said mounting means are adapted to allow relative radial expansion between said aerofoil portions and rings and said fixed engine structure.

7. A nozzle guide vane assembly as claimed in claim 6 and in which said mounting means comprise projections from the inner and outer extremities of each aerofoil portion and abutments from said fixed structure, the abutments being adapted to be able to move so as to allow said relative expansion.

8. A nozzle guide vane assembly as claimed in claim 7 and in which said abutments comprise separate axially extending fingers.

9. A nozzle guide vane assembly as claimed in claim 8 and in which there is a single support ring from which project said fingers which form abutments for one of the extremities of the aerofoil portions.

10. A nozzle guide vane assembly as claimed in claim 9 and in which each said ring engages with fixed engine structure so as to be retained against translational motion but so as to be allowed to twist to a limited degree.

* * * * *